(12) United States Patent
Kamiyama et al.

(10) Patent No.: US 8,837,114 B2
(45) Date of Patent: Sep. 16, 2014

(54) SOLID ELECTROLYTIC CAPACITOR

(75) Inventors: Nozomu Kamiyama, Tokyo (JP); Kenji Machida, Tokyo (JP); Atsushi Yoshizawa, Tokyo (JP); Sekihiro Takeda, Tokyo (JP); Kenji Tamamitsu, Tokyo (JP)

(73) Assignee: Nippon Chemi-Con Corporation

( * ) Notice: Subject to any disclaimer, the term of this patent is extended or adjusted under 35 U.S.C. 154(b) by 80 days.

(21) Appl. No.: 13/637,337

(22) PCT Filed: Mar. 29, 2011

(86) PCT No.: PCT/JP2011/001855
§ 371 (c)(1),
(2), (4) Date: Nov. 27, 2012

(87) PCT Pub. No.: WO2011/121995
PCT Pub. Date: Oct. 6, 2011

(65) Prior Publication Data
US 2013/0070393 A1    Mar. 21, 2013

(30) Foreign Application Priority Data
Mar. 31, 2010  (JP) ................................. 2010-084709

(51) Int. Cl.
H01G 9/02  (2006.01)
H01G 9/00  (2006.01)

(52) U.S. Cl.
USPC ........................ 361/525; 361/523; 29/25.03

(58) Field of Classification Search
USPC .................. 361/523, 525, 528, 532; 29/25.03
See application file for complete search history.

(56) References Cited

U.S. PATENT DOCUMENTS

| 5,766,515 | A | 6/1998 | Jonas et al. | |
| 6,166,899 | A * | 12/2000 | Tamamitsu | 361/504 |
| 7,639,475 | B2 * | 12/2009 | Ro et al. | 361/516 |

FOREIGN PATENT DOCUMENTS

| JP | 8-48858 | 2/1996 |
| JP | 9-293639 | 11/1997 |
| JP | 10-64763 | 3/1998 |
| JP | 2007-184317 | 7/2007 |
| JP | 2007-184318 | 7/2007 |

* cited by examiner

Primary Examiner — Jayprakash N Gandhi
Assistant Examiner — Dion R Ferguson

(57) ABSTRACT

A solid electrolytic capacitor is impregnated with a conductive polymer dispersion solution comprising sorbitol. In the capacitor, the hydroxyl group of sorbitol acts as the oxygen source necessary for the anodic oxidation of anodic oxide film when voltage is applied to the solid electrolytic capacitor. Consequently, the oxide film is repaired and withstand voltage property is improved, which is thought to be due to the anodic oxidation that repairs the damage on the oxide film. Superior electric capacitance can further be attained by specifying the sorbitol content in the dispersion solution to be at 60-90 wt %.

4 Claims, 1 Drawing Sheet

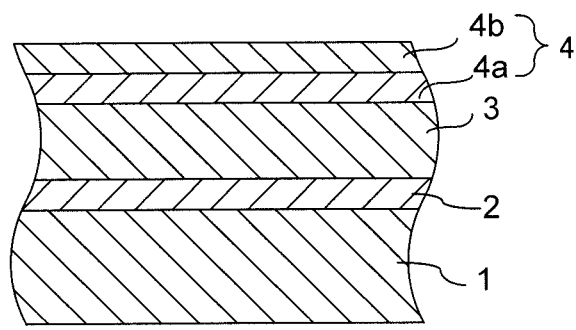

ically showing a cross-sectional view of a solid
SOLID ELECTROLYTIC CAPACITOR

TECHNICAL FIELD

The present invention relates to a solid electrolytic capacitor, in particular, the present invention relates to a solid electrolytic capacitor wherein a solid electrolyte layer is formed by a conductive polymer dispersion solution.

BACKGROUND ART

An electrolytic capacitor that utilizes a metal having valve action such as aluminum is widely commonly used, since compact yet large capacitance can be obtained by shaping a valve action metal as the anodic electrode into an etching foil, etc so as to increase the surface area of the dielectric. In particular, since a solid electrolytic capacitor that employs a solid electrolyte as the electrolyte is equipped with features such as being easily made into a chip and suitable for surface mounting in addition to being compact, large capacitance, and low equivalent series resistance, it is essential for downsizing and greater functionality of electronic equipments.

A conductive polymer having high electric conductivity and superior in adherence with the oxide film layer an anodic electrode is employed as the solid electrolyte for solid electrolytic capacitor. For example, polyaniline, polypyrrole, polythiophene, polyethylenedioxythiophene or a derivative thereof are known as this conductive polymer.

For example, it is disclosed in Patent Document 1 that the anode and cathode foils are wound via a separator to form a capacitor element, this capacitor element is impregnated with EDOT and an oxidant solution, heated, and a PEDOT polymer layer is formed between the two electrodes to form a solid electrolytic capacitor.

In this solid electrolytic capacitor of Patent Document 1, since the oxidant solution shows substantial acidity, the dielectric layer which is an oxide film is eroded, increase in equivalent series resistance occurs, and withstand voltage is reduced. Accordingly, in order to prevent the erosion of the dielectric, Patent Document 2 discloses a solid electrolytic capacitor in which the solid electrolyte is formed by forming a solid electrolyte by applying a conductive polymer dispersion solution having weakened acidity or treated with alkali on the surface of the anode foil and drying, and then polymerizing a polymerizable monomer on the surface of this solid electrolyte layer.

Patent Document 1: JP 9-293639 A
Patent Document 2: JP 2007-184317 A

However, since the process will be complex in a solid electrolytic capacitor such as that in Patent Document 2, it is therefore desired to enhance the withstand voltage in a solid electrolytic capacitor formed from a solid electrolyte by applying an alkali treated conductive polymer dispersion solution and drying.

Accordingly, the present invention is proposed to solve the problems of the conventional technology as stated above, the object of which is to provide a solid electrolytic capacitor having high withstand voltage in which the solid electrolyte layer is formed with a conductive polymer dispersion solution.

SUMMARY OF THE INVENTION

The solid electrolytic capacitor of the present invention has an anode body consisting of a valve metal, and a dielectric oxide film layer, a solid electrolyte layer, and a cathode layer sequentially formed on the surface of the anode body, and the anode body is impregnated with a conductive polymer dispersion solution comprising sorbitol to form a solid electrolyte comprising 60-90 wt % of the sorbitol.

In addition, the method for producing the solid electrolytic capacitor of the present invention comprises the steps of; forming an anode body consisting of a valve metal, sequentially forming a dielectric oxide film layer, a solid electrolyte layer, and a cathode layer on the surface of the anode body; and impregnating the anode body with a conductive polymer dispersion solution comprising sorbitol to form a solid electrolyte comprising 60-90 wt % of the sorbitol.

According to the present invention, by impregnating with a conductive polymer dispersion solution comprising sorbitol, the hydroxyl group of sorbitol acts as the oxygen source necessary for the anodic oxidation of anodic oxide film when voltage is applied to the solid electrolytic capacitor. Consequently, the oxide film is repaired and withstand voltage property is improved, which is thought to be due to the anodic oxidation that repairs the damage on the oxide film. The rate of change in electric capacitance can further be retained in a good range by specifying the sorbitol content in the solid electrolyte to be at 60-90 wt %.

DESCRIPTION OF THE DRAWING

The drawing discloses a cross-sectional view of a solid electrolytic capacitor.

DESCRIPTION OF EMBODIMENTS

The embodiments of the solid electrolytic capacitor of the present invention will now be described. In the solid electrolytic capacitor of the present invention, an anode body 1 consisting of a valve action metal such as aluminum and having an oxide film layer 2 formed on the surface is impregnated with a conductive polymer dispersion solution comprising sorbitol, and then dried to form the solid electrolyte 3 including sorbitol. A solid electrolytic capacitor is formed by forming a carbon layer 4a as the cathode leader layer on the surface of this anode body, and a silver layer 4b thereon as the conductive layer so as to form a cathode layer 4.

The sorbitol content in solid electrolyte is 60-90 wt %. At below this range, sufficient ESR property or withstand voltage property cannot be obtained because oxide film repairing is not sufficiently performed. Moreover, at above this range, ESR property or withstand voltage property is improved but the rate of change in electric capacitance will be increased.

This can also be employed for a winding-type electrolytic capacitor shown below. In other words, an anode foil consisting of a valve action metal such as aluminum and having an oxide film layer formed on the surface and a cathode foil are wound or laminated via a separator containing a non-woven fabric of synthetic fiber to form a capacitor element. Then, after subjecting to repair formation by immersing this capacitor element in an aqueous solution containing phosphoric acid and applying voltage or to warm water immersion treatment for dissolving a binder of the above synthetic fiber, the capacitor element is impregnated with a conductive polymer dispersion solution comprising sorbitol and dried, and a solid electrolyte layer is formed between the anode and cathode foils. After subjecting this capacitor element to a drying step, it is housed in an armored case such as a metal case and the opening of the armored case is sealed with a sealing rubber, and a solid electrolytic capacitor having a solid electrolyte comprising 5-15 wt % of sorbitol is produced.

The anode foil consists of a valve action metal foil such as aluminum, and its surface is roughened by electrochemical etching treatment in an aqueous solution of chloride to form numerous etching pits. An oxide film layer which becomes a dielectric when voltage is applied in an aqueous solution such as ammonium borate is further formed on the surface of this anode foil.

The cathode foil employed for the winding-type solid electrolytic capacitor consists of a valve action metal foil such as aluminum as with the anode foil, and examples thereof includes: (1) those with etching treatment applied to the surface; (2) those that employ a plain foil without applying etching treatment; (3) those having an oxide film formed on the surface of said (1) or (2); and (4) those having a metal thin film layer consisting of a metal such as titanium and nickel or a carbide, a nitride, or a carbonitride thereof or a mixture thereof, or other carbon thin films formed on the surface of said (1), (2), or (3).

In the winding-type solid electrolytic capacitor, the anode and cathode foils each have a lead wire for connecting the electrode to the exterior, which are connected by a well-known means such as stitching and ultrasonic wave welding. This lead wire consists of aluminum etc., consists of the junction of the anode and cathode foils as well as the exterior junction responsible for electric connection with the exterior, and is lead out from the edge face of the wound or laminated capacitor element.

A separator comprises a non-woven fabric of synthetic fiber. Examples of a synthetic fiber include a polyester-based fiber such as polyethylene terephthalate, polybutylene terephthalate, polyethylene naphthalate, or a derivative thereof, a polyamide-based fiber such as a vinylon-based fiber, aliphatic polyamide, semiaromatic polyamide, or wholly aromatic polyamide, a polyimide-based fiber, a polyethylene fiber, a polypropylene fiber, a trimethylpentene fiber, a polyphenylene sulfide fiber, and an acrylic fiber, wherein these fibers are used alone or multiple fibers are blended. Among these, acrylic fiber having heat resistance and decomposition temperature at 300° C., as well as polyethylene terephthalate, an aramid fiber, and a polyamide-based fiber are preferred. A semiaromatic polyamide herein refers to, but is not limited to, for example those having an aliphatic chain in a part of the backbone.

The capacitor element is then housed in an outer case such as a metal case, the opening of the armored case is sealed with a sealing rubber, and subjected to an aging treatment of applying rated voltage at a given temperature.

The conductive polymer dispersion solution for impregnating the anode body will be described next. The conductive polymer dispersion solution is a solution of fine particles of the conductive polymer dispersed in a solvent. These fine particles of the conductive polymer generally have extremely small particle size at 100 nm or less. Examples of a conductive polymer include polypyrroles, polythiophenes, polyacetylenes, polyphenylenes, polyphenylenevinylenes, polyanilines, polyacenes, polythiophenevinylenes, and a copolymer thereof. Among these, polypyrroles, polythiophenes, and polyanilines are preferred in regards to easy polymerization and stability in air. Among polythiophenes, polyethylenedioxythiophene is preferred since it has extremely high conductivity in an oxidized form. A solvent for the conductive polymer dispersion solution includes water and/or organic solvent. It is preferred that this dispersion solution contains a sulfonic-based dopant such as polystyrene sulfonate; it may also contain for example a surfactant or an organic binder. Accordingly, the dispersion solution is high in acidity. The concentration of the fine particles of the conductive polymer in the conductive polymer dispersion solution is generally preferably in the range of 1-5 wt %.

Moreover, the pH of the conductive polymer dispersion solution is controlled in the range of 4-10 in order to form a good solid electrolyte layer. It is thought that sorbitol is prone to evaporation in the drying step at below this range, and therefore oxide film repairing will be insufficient and a harmful influence is exerted on the formability of the solid electrolytic layer. Also, at above this range, the withstand voltage property will be reduced due to an unknown reason.

After impregnating the anode body with the conductive polymer dispersion solution, it is dried at a temperature range of 100-200° C., the solvent etc. is removed from the conductive polymer dispersion solution, and a solid electrolyte layer is formed between the anode and cathode foils of the capacitor element. Impregnating herein refers to a treatment of allowing the dispersion solution to be contained in the capacitor element. For example, it is possible to allow the dispersion solution to be contained in the capacitor element by immersing the capacitor element in the dispersion solution. Since the concentration of the fine particles of the conductive polymer of the conductive polymer dispersion solution is low, it is preferred to perform the above impregnating-drying step multiple times for securing the amount of the solid electrolyte layer loaded in the capacitor element. Although this impregnating step can be performed under normal pressure, the solid electrolyte layer can be formed into the depth of the etching pit of the anode and cathode foils by performing under reduced or increased pressure.

EXAMPLES

Subsequently, the present invention will be further described in detail based on Examples and Comparative Examples produced as follows.

Example 1

To a conductive polymer dispersion solution (dispersion) of 3,4-ethylenedioxythiophene (PEDOT), sorbitol was added and stirred for 5 minutes. pH was also adjusted to 8. Subsequently, 100 μL of this dispersion was added dropwise to an 1 $cm^2$ aluminum etching foil having a 3 V oxide film formed thereon, dried at 60° C. for 1 hour, at 130° C. for 30 minutes, and at 180° C. for 1 hour to allow formation a PEDOT film on the aluminum etching foil. The sorbitol content in the solid electrolyte layer was calculated from contents of sorbitol and PEDOT in the dispersion solution to be 83%. A carbon layer and a silver layer were further applied as the cathode leader layer to prepare a solid electrolytic capacitor. ESR and withstand voltage of the solid electrolytic capacitor obtained were evaluated.

Examples 2 to 3

The solid electrolytic capacitors of Examples 2 to 3 were prepared as in Example 1 except that the sorbitol content in the solid electrolyte was 70 wt % and 60 wt %.

Comparative Examples 1 to 5

The solid electrolytic capacitors of Comparative Examples 1 to 5 were prepared as in Example 1 except that the sorbitol content in the solid electrolyte was outside the content range of the present application.

Comparative Example 6

The solid electrolytic capacitors of Comparative Example 6 were prepared as in Example 1 except that sorbitol was not contained in the solid electrolyte.

ESR, withstand voltage, and change in electric capacitance (ΔCAP) of the above solid electrolytic capacitors are shown in Table 1.

TABLE 1

|  | Sorbitol content in solid electrolyte (wt %) | ESR (Ω) | Withstand voltage (V) | ΔCAP (%) |
|---|---|---|---|---|
| Example 1 | 83 | 0.05 | 130 | −15 |
| Example 2 | 70 | 0.05 | 128 | −14 |
| Example 3 | 60 | 0.05 | 120 | −9 |
| Comparative Example 1 | 33 | 0.05 | 108 | −6 |
| Comparative Example 2 | 50 | 0.05 | 105 | −6 |
| Comparative Example 3 | 91 | 0.05 | 151 | −20 |
| Comparative Example 4 | 94 | 0.05 | 160 | −21 |
| Comparative Example 5 | 97 | 0.09 | 160 | −24 |
| Comparative Example 6 | — | 4.1 | 60 | −5 |

As apparent from Table 1, the rate of change in electric capacitance is slightly raised in the solid electrolytic capacitors of Examples 1 to 3 compared to Comparative Examples 1, 2, and 6 which have a sorbitol content of less than 60 wt %. However, ESR property and withstand voltage property are significantly improved compared to Comparative Example 6, and withstand voltage property is also improved compared to Comparative Examples 1 and 2. In addition, the rate of change in electric capacitance is retained well compared to Comparative Examples 3 to 5 which have a sorbitol content of greater than 90 wt %.

Next, the pH of the conductive polymer dispersion solution will now be verified.

Examples 4 and 5

The solid electrolytic capacitors of Examples 4 and 5 were prepared as in Example 1 except that the pH of the conductive polymer dispersion solution was 4 and 10.

Comparative Examples 7 and 8

The solid electrolytic capacitors of Comparative Examples 7 and 8 were prepared as in Example 1 except that the pH of the conductive polymer dispersion solution was 2 and 13.

Withstand voltage and change in electric capacitance (ΔCAP) of the above solid electrolytic capacitors are shown in Table 2.

TABLE 2

|  | pH of dispersion solution | Withstand voltage (V) | DCAP (%) |
|---|---|---|---|
| Example 4 | 4 | 125 | −12 |
| Example 1 | 8 | 130 | −15 |
| Example 5 | 10 | 130 | −15 |
| Comparative Example 7 | 2 | 80 | −7 |
| Comparative Example 8 | 13 | 60 | −15 |

As apparent from Table 2, the formability of solid electrolyte layer is thought to be retained well in the solid electrolytic capacitors of Examples 1, 4 and 5, since withstand voltage property is improved compared to Comparative Examples 7 and 8 in which the pH of the dispersion solution is outside the scope of the present application.

The invention claimed is:

1. A solid electrolytic capacitor having an anode body consisting of a valve metal, and a dielectric oxide film layer, a solid electrolyte layer, and a cathode layer sequentially formed on the surface of the anode body, the anode body being impregnated with a conductive polymer dispersion solution comprising sorbitol to form a solid electrolyte comprising 60-90 wt % of the sorbitol.

2. The solid electrolytic capacitor according to claim 1, characterized in that pH of said dispersion solution is 4-10.

3. A method for producing a solid electrolytic capacitor, comprising the steps of:
    forming an anode body consisting of a valve metal, and sequentially forming a dielectric oxide film layer, a solid electrolyte layer, and a cathode layer on the surface of the anode body; and
    impregnating the anode body with a conductive polymer dispersion solution comprising sorbitol to form a solid electrolyte comprising 60-90 wt % of the sorbitol.

4. The method for producing a solid electrolytic capacitor according to claim 3, wherein pH of said dispersion solution is 4-10.

* * * * *